Figure 1:
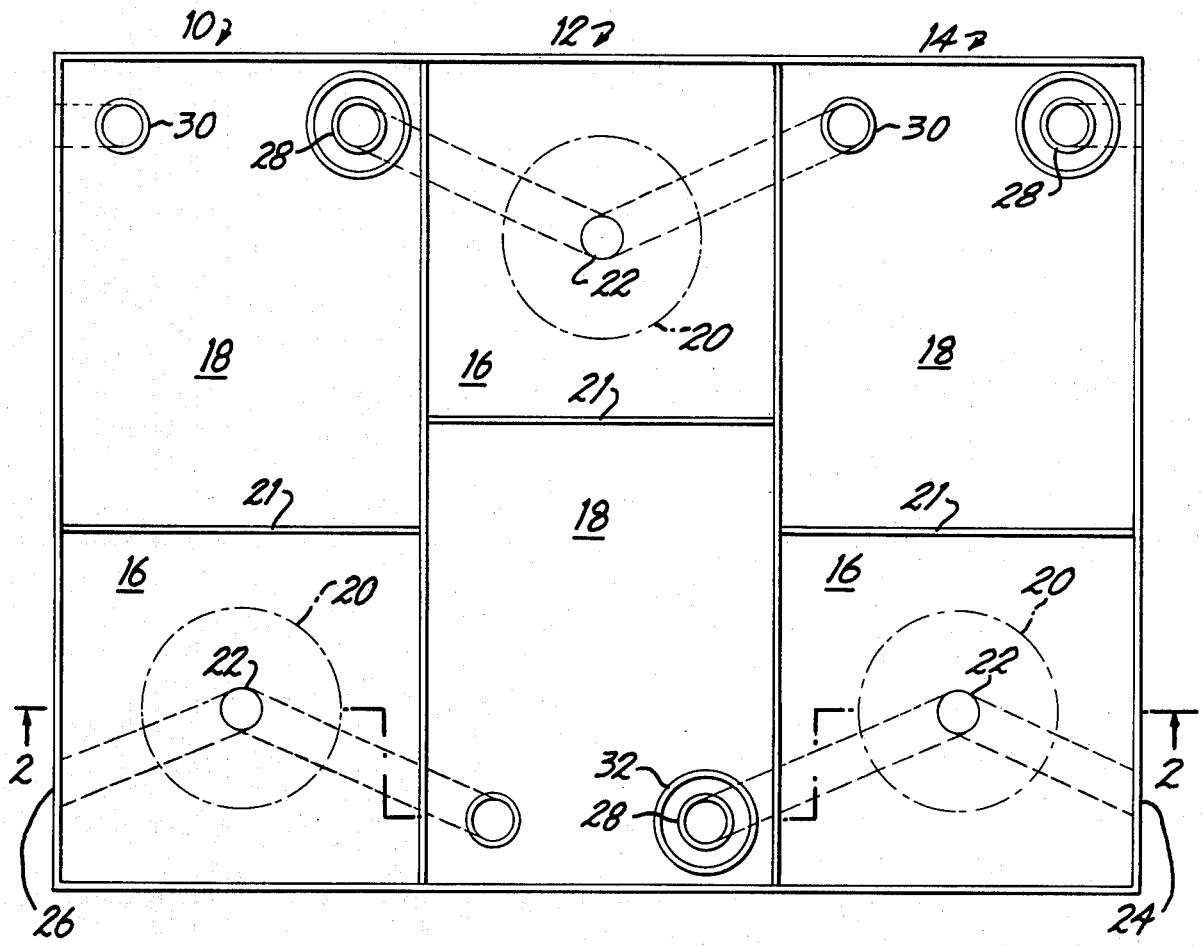

United States Patent [19]

Gjelsvik

[11] 4,352,574
[45] Oct. 5, 1982

[54] MIXER-SETTLER APPARATUS

[75] Inventor: Norvald Gjelsvik, Oslo, Norway

[73] Assignee: Forskningsgruppe for Sjeldne Jordarter, Oslo, Norway

[21] Appl. No.: 91,481

[22] Filed: Nov. 5, 1979

[30] Foreign Application Priority Data

Oct. 12, 1978 [NO] Norway .................................. 783453

[51] Int. Cl.³ .................. B01F 15/02; B01D 21/24
[52] U.S. Cl. ................................... 366/194; 210/319
[58] Field of Search ............... 366/291, 173, 349, 184, 366/192, 194; 210/320, 319

[56] References Cited

U.S. PATENT DOCUMENTS 2,648,529  8/1953  Wigton ............................... 366/291
2,845,936  8/1958  Boynton ............................. 366/291
3,206,288  9/1965  Hazen .................................. 23/310
3,544,079 12/1970  Dressler ............................. 366/173
3,997,445 12/1976  Hannestad ......................... 210/319

FOREIGN PATENT DOCUMENTS 126567   7/1973  Denmark .
2529003  1/1976  Fed. Rep. of Germany .
2540689  3/1977  Fed. Rep. of Germany .
 47155  11/1973  Finland .
2276853  8/1977  France .

Primary Examiner—Robert W. Jenkins
Attorney, Agent, or Firm—Eyre, Mann, Lucas & Just

[57] ABSTRACT

A mixer-settler apparatus is disclosed. The outlet tubes from the settler section are made positively adjustable in height so that proper phase separation can be obtained under varying conditions.

1 Claim, 2 Drawing Figures

MIXER-SETTLER APPARATUS

The present invention relates to mixer-settler apparatus such as is used in liquid-liquid extractions. These mixer-settlers are well known pieces of equipment. The present invention is particularly directed to laboratory usage but the principles of it are also applicable to large-scale operations, especially in pilot plant or experimental areas. The known mixer-settlers for laboratory work are quite effective for accomplishing liquid-liquid extractions. However, it has been found that it is highly desirable to be able to adjust and control the height of the exit orifices for the heavy phase and the light phase so that variations in the process can be studied or adjusted as needed. It has been found that this is particularly beneficial when the volume of the light and heavy phases changes or when different density extractants are employed from those for which the particular mixer-settler was designed. The applicant has found that positive adjustment of the height of the exit orifices for the light and heavy phases can be readily achieved by making them adjustable with screw threads. The advantage to screw threads as opposed to other forms of adjustment is the infinite number of adjustments which can be achieved with a screw thread as well as the positive locking nature of screw threads which avoids all but the most minor variations in orifice height.

It has been known in the past to adjust the height of the tube for removing the heavy density phase, see the example U.S. Pat. No. 3,997,445. The apparatus taught in this invention however, has the disadvantage that the adjustment is made through a bellows type arrangement and is not a positive adjustment. Furthermore, neither this reference nor any other prior art known to the applicant has appreciated that it is desirable to be able to adjust the height of both the light phase and the heavy phase exit tubes in a positive manner.

Figure 2:
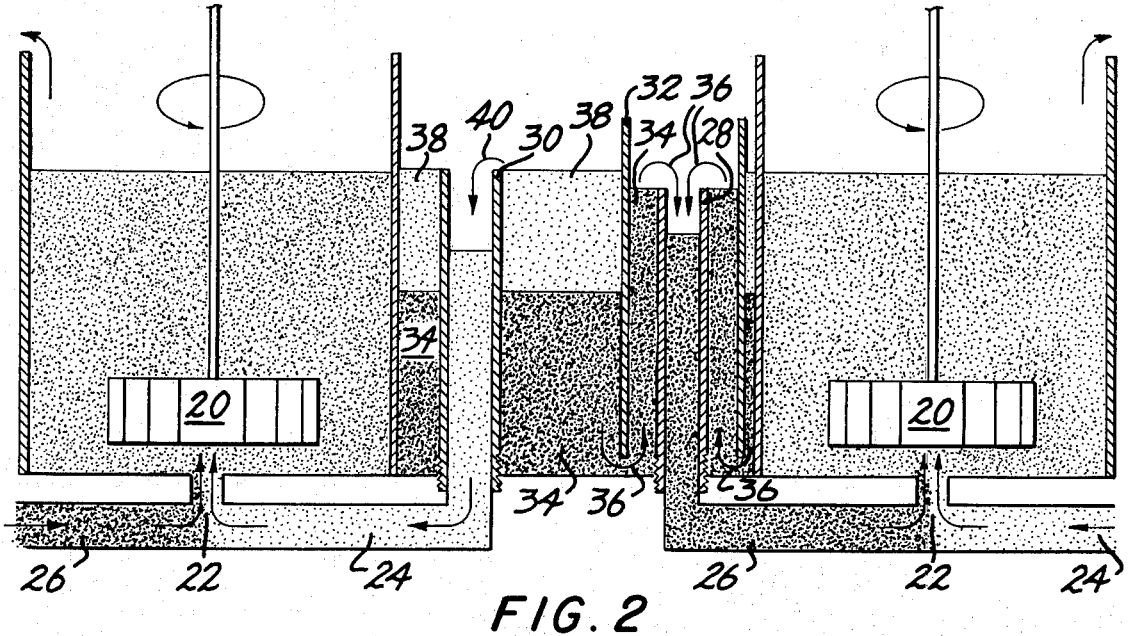

These and other aspects of the present invention may be more fully understood with reference to the drawings herein:

FIG. 1 is a top diagramatic view of apparatus according to the present invention and FIG. 2 is a cross-section through line 2—2 of FIG. 1.

Referring first to FIG. 1, there are shown three separate apparatuses 10, 12 and 14 used in tandem. It will be appreciated that there could be as many as or as few of these units as desired and the number is not limited to three.

Each unit 10, 12 and 14 comprises a mixer chamber 16 and a settler chamber 18 divided by a barrier 20 of known construction, see for example elements 28 and 34 of U.S. Pat. No. 3,997,445 incorporated herein by reference. The mixer portion has a rotating stirrer member 20 and an inlet orifice 22 located therebeneath, see especially FIG. 2.

In operation, the light phase is introduced through pipe 24 to orifice 22 and the heavy phase is introduced through pipe 26 to orifice 22. It will be appreciated that the pipes 24 and 26 at the exposed ends of the mixer-settler system will be fed directly rather than from an adjacent unit.

After the light and heavy liquids are mixed, they pass barrier 20 into the settling chamber 16. From the settling chamber, the heavy liquid phase is removed through pipe 28 while the light liquid phase is removed through pipe 30. In accordance with the present invention, at least one of the pipes is threaded as shown so that its vertical height can be adjusted by simply turning the pipe. Preferably both pipes are made adjustable in height. If desired, means (not shown) can be provided for preventing further rotation of the pipe after a desired height has been obtained. Furthermore, it is to be understood that the threads need not be in the location shown and could even be above the top of the pipe with an appropriate supporting superstructure. The important feature is that the pipe be positively adjustable in height.

A tube 32 suitably surrounds the tube 28 so that the heavy liquid phase 34 will follow the direction of the arrows 36 while the light liquid phase 38 follows the direction of the arrow 40. As can be seen in FIG. 2, the tube 32 or similar device has a wall height which is above the liquid level in the settler chamber 18.

It will be appreciated that the foregoing apparatus is especially desirable for maintaining phase separation constant despite changes in the specific density of the extractant liquids since the tubes 28 and 30 can be positively adjusted for height. Furthermore, this can be done on a continuous basis, as desired, thus providing a favorable laboratory tool.

It will be appreciated that various changes and modifications can be made to the preferred embodiment of the invention without departing from the spirit and scope of the invention. Therefore, it will be understood that the claims are intended to cover the entire invention.

What is claimed is:

1. In a mixer-settler apparatus comprising a mixer chamber and a settler chamber and heavy phase and light phase exit tubes in said settler chamber, the improvement comprising each said exit tube being positively vertically adjustable in height, the positive vertical adjustment in height being accomplished through a threaded portion of the bottom of each said exit tubes.

* * * * *